United States Patent
Wakai

(10) Patent No.: US 10,171,774 B2
(45) Date of Patent: Jan. 1, 2019

(54) CAMERA CONTROL DEVICE, CAMERA CONTROL METHOD, AND CAMERA CONTROL SYSTEM

(71) Applicant: Panasonic Intellectual Property Corporation of America, Torrance, CA (US)

(72) Inventor: Ryohei Wakai, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 600 days.

(21) Appl. No.: 14/247,324

(22) Filed: Apr. 8, 2014

(65) Prior Publication Data

US 2014/0313301 A1 Oct. 23, 2014

(30) Foreign Application Priority Data

Apr. 19, 2013 (JP) ................. 2013-088098

(51) Int. Cl.
*H04N 5/232* (2006.01)
*H04N 7/18* (2006.01)

(52) U.S. Cl.
CPC ............... *H04N 7/18* (2013.01); *H04N 5/232* (2013.01)

(58) Field of Classification Search
CPC .... H04N 7/181; H04N 5/232; H04N 5/23206; H04N 7/18; H04N 5/23203; H04N 1/00244; H04N 2201/3253; G01C 21/20; G01C 21/26; H04W 4/02; G06K 9/00771; G06F 17/30265
See application file for complete search history.

(56) References Cited

U.S. PATENT DOCUMENTS

| | | | | |
|---|---|---|---|---|
| 2007/0118508 | A1* | 5/2007 | Svendsen | G06F 17/30265 |
| 2009/0189811 | A1* | 7/2009 | Tysowski | G01S 19/14 |
| | | | | 342/357.34 |
| 2009/0248284 | A1* | 10/2009 | Yoshioka | G01C 21/26 |
| | | | | 701/117 |
| 2010/0097475 | A1 | 4/2010 | Yokomitsu | |

(Continued)

FOREIGN PATENT DOCUMENTS

| | | |
|---|---|---|
| JP | 2005-142683 | 6/2005 |
| JP | 2008-219570 | 9/2008 |
| JP | 2009-272882 | 11/2009 |

OTHER PUBLICATIONS

International Search Report dated Jun. 3, 2014 in International (PCT) Application No. PCT/JP2014/001501.

*Primary Examiner* — Farhan Mahmud
(74) *Attorney, Agent, or Firm* — Wenderoth, Lind & Ponack, L.L.P.

(57) ABSTRACT

A camera control device includes: an entering prediction value calculator configured to calculate an entering prediction value representing a possibility of entering of the user terminal in a monitoring range of the camera; an entering prediction time calculator configured to calculate entering prediction time that is prediction time necessary for the entering of the user terminal in the monitoring range of the camera; a preparation time calculator configured to calculate preparation time necessary for running the application on the camera; and a determination unit configured to determine whether preparation for running of an application on the camera is started.

20 Claims, 10 Drawing Sheets

(56) References Cited

U.S. PATENT DOCUMENTS

2010/0149335 A1\* 6/2010 Miller, II ............... H04N 7/181
                                                    348/148
2011/0298930 A1\* 12/2011 Allegra .................. H04N 7/181
                                                    348/159

\* cited by examiner

FIG. 4A

| Camera ID | Monitoring camera position information | Communication speed | Activating application ID | Installed application ID |
|---|---|---|---|---|
| 00001000 | E135.586N34.738 | 3Mbps | 10000000 10000008 | 10000006 |
| 00001001 | E135.576N34.737 | 10Mbps | - | - |
| 00001002 | E135.565N34.734 | 1Mbps | 10000003 | 10000001 |
| ⋮ | ⋮ | ⋮ | | |

Monitoring camera information database 400

FIG. 4B

| User terminal ID | User terminal position information | Use application ID | Moving history information |
|---|---|---|---|
| 00100000 | E135.565N34.734 | 10000003 | ⋮ |
| 00100001 | E135.576N34.736 | 10000007 | ⋮ |
| 00100002 | E135.572N34.728 | - | ⋮ |
| ⋮ | ⋮ | ⋮ | ⋮ |

User terminal information database 410

FIG. 4C

| Application ID | Size | Application saving place |
|---|---|---|
| 10000000 | 1.2MB | /pkgdata/a.zip |
| 10000001 | 250KB | /pkgdata/b.zip |
| 10000002 | 680KB | /pkgdata/c.zip |
| ⋮ | ⋮ | |

Application information database 420

FIG. 5

| User terminal ID | Camera ID | Entering prediction value | Float |
|---|---|---|---|
| 00100000 | 00001000 | 0.03 | 20 minutes |
| | 00001001 | 0.1 | 5 minutes |
| | ⋮ | ⋮ | ⋮ |
| 00100001 | 00001000 | 0.01 | 10 minutes |
| | 00001001 | 0.8 | 20 seconds |
| | ⋮ | | |
| ⋮ | ⋮ | | ⋮ |

Installation necessity determination information database 500

CAMERA CONTROL DEVICE, CAMERA CONTROL METHOD, AND CAMERA CONTROL SYSTEM

CROSS REFERENCE TO RELATED APPLICATION

The present application claims the benefit of Japanese Patent Application No. 2013-088098 filed on Apr. 19, 2013. The entire disclosure of the above-identified application, including the specification, drawings and claims, is incorporated herein by reference in its entirety.

BACKGROUND OF THE INVENTION

1. Field of the Invention

The present disclosure relates to a camera control device for controlling camera applications.

2. Description of the Related Art

Conventionally, a camera that can monitor a front of a monitoring target is selected from a plurality of fixed cameras (see Japanese Patent Publication No. 2005-142683). Further, a current position of an observation target is compared with history position information representing past moving routes of the observation target so that a moving destination of the observation target is estimated. Thereafter, a camera for monitoring the moving destination is selected (see Japanese Patent Publication No. 2009-272882).

However, in the conventional constitution, a suitable time at which preparation for running an application on the selected camera is started cannot be determined. For this reason, it is difficult to effectively use hardware resources such as cameras.

The present disclosure provides a camera control device that can determine suitable time at which preparation for running an application on a camera is started.

SUMMARY OF THE INVENTION

A camera control device according to an aspect of the present disclosure includes an entering prediction value calculator configured to calculate an entering prediction value representing a possibility of entering of a user terminal in a monitoring range of the camera based on moving history information about the user terminal, an entering prediction time calculator configured to calculate entering prediction time that is prediction time necessary for the entering of the user terminal in the monitoring range of the camera based on first information representing a position of the user terminal and second information representing a position of the camera, a preparation time calculator configured to calculate preparation time necessary for running an application on the camera, and a determination unit configured to determine whether preparation for running the application on the camera is started based on the entering prediction value, the entering prediction time and the preparation time.

These general or concrete aspects may be realized by a method, a system, an integrated circuit, a computer program or a computer-readable recording medium such as a CD-ROM, or by any combination of the method, the system, the integrated circuit, the computer program, and the recording medium.

The camera control device in the present disclosure can determine suitable time at which the preparation for running the application on the camera is started.

BRIEF DESCRIPTION OF DRAWINGS

FIG. 4A is a diagram illustrating a monitoring camera information database according to the embodiment.

FIG. 4B is a diagram illustrating a user terminal information database according to the embodiment.

FIG. 4C is a diagram illustrating an application information database according to the embodiment.

FIG. 5 is a diagram illustrating an installation necessity determination information database according to the embodiment.

DETAILED DESCRIPTION OF THE PREFERRED EMBODIMENTS

Figure 1:
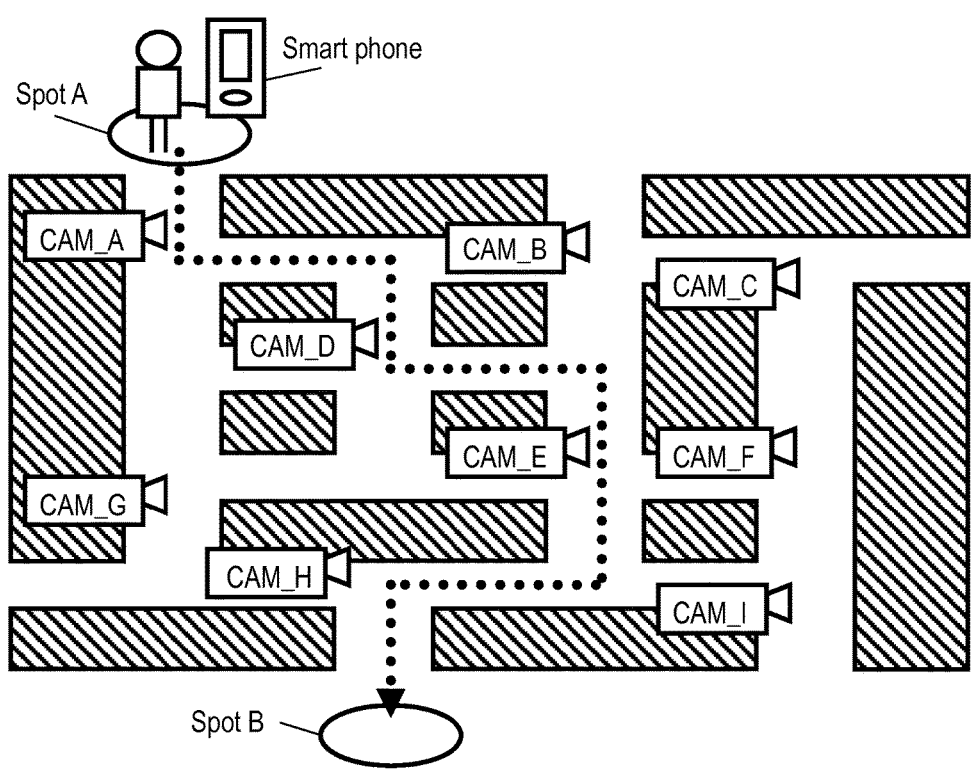
FIG. 1 is a diagram describing a problem.

Knowledge on which the Present Disclosure is Based

The inventor of the present disclosure has found that conventional techniques have the following problem.

In recent years, a lot of monitoring cameras are fixed on streets, in shops and on roads in order to prevent crime and record evidence images at criminal occurrence time. Further, according to enhance an intelligent function of monitoring cameras, monitoring cameras are practically used for purposes other than monitoring. For example, it is proposed that automatically discriminated information related to a visitor to a shop is used for marketing. The automatically discriminated information includes his or her age, gender, action pattern, and stay situation based on information obtained by the monitoring camera fixed in the shop. Due to such various applications of monitoring cameras, the supply of monitoring cameras which functions can be dynamically added to and deleted from is being demanded.

Some manufactures of monitoring cameras provides SDK (Software Development Kit) for a development of an application running on monitoring cameras, and the developed application can be dynamically installed to and uninstalled from the monitoring camera via a network. it is predicted that an increasing number of monitoring cameras which such an application is dynamically installed to and uninstalled from are fixed on streets, in ships and on roads.

On the other hand, spread of a smart phone having a GPS (Global Positioning System) function and the Internet continuous connecting function can easily realize to obtain personal position information at real time. When monitoring cameras which are fixed everywhere in towns and which applications can be dynamically installed on and uninstalled from are cooperated with smart phones, monitoring cameras located near a specific person being tacked are sequentially selected so that a special application can be automatically installed and be run on sequentially selected cameras.

When such a system is used, for example, an application with which parents can keep an eye on their children can be realized. That is to say, a smart phone is given to a child, and position information about the smart phone is obtained so that monitoring cameras near the smart phone are searched. An application having a function of distributing a moving image or a still image of the child to the parent is installed on at least one camera selected from the searched monitoring cameras and is run on the at least one selected camera. When the child moves, a monitoring camera fixed near a moving destination is searched again based on the position information about the smart phone. The application is allowed to run on the monitoring camera so as to be capable of always checking a state of the child while the child is tracked according to the movements. When a function for discriminating characteristic information such as a face and cloths of a child is provided to the application, a zoom image of the child is cut out so to be capable of being distributed to a parent's terminal. Alternatively, when a function for discriminating a face of a person having a criminal record is provided to the application and a specific person having a criminal record approaches the child, the parent's terminal is notified of this situation.

Further, the system having a function for distributing a person's image, according to the person's movement, to a specific server or terminal which records the image can be used for a life-log application. Alternatively, when the system has the function for recording an image monitored while a car on which a user ride is being tracked, a recorded image can be used as an evidence of a car accident.

Japanese Patent Publication No. 2005-142683 discloses a method for specifying a monitoring camera that can photograph a front of an observation target from a plurality of monitoring cameras. When a plurality of monitoring cameras are present near the smart phone, this technique can be used as one method for selecting a suitable camera as a camera on which the application is allowed to run.

Patent document 2 discloses a method for predicting a moving destination of observation target and selecting a monitoring camera present on the moving destination, but timing at which preparation for an operation in the monitoring camera is started cannot be specified.

For example, suppose a case where a person who has a smart phone enters an area where nine monitoring cameras CAM_A to CAM_I are set as shown in FIG. 1. And, suppose the past moving history information about the smart phone is stored in the smart phone, and the person moves to pass through a route of a dotted-line arrow from a spot A to a spot B shown in FIG. 1 based on the information. The monitoring cameras CAM_A, CAM_D, CAM_E, and CAM_H can monitor that route. Since it takes short time for this person to reach a monitoring range of the monitoring camera CAM_A, an application is immediately installed on the monitoring camera CAM_A so that activation of the application should be prepared. On the other hand, since this person has enough time to reach the monitoring range of the monitoring camera CAM_H, the application does not have to be immediately installed on the monitoring camera CAM_H. Further, since this person does not possibly take a predicted action, such as going towards another spot, going back, or takes another route, as the person is separated from spot A as a present spot, the likelihood of actual entering in that spot is gradually decreased even on the predicted route. Therefore, even when the application is installed on the monitoring camera CAM_H at the timing at which this person is at spot A, this person does not enter in the monitoring range of the monitoring camera CAM_H, and the process for installing the application on the monitoring camera CAM_H is likely unnecessary.

Since the application installing process and the activating process are processes using resources such as a CPU and a storing unit of the monitoring camera and using network resources, if the application is installed needlessly on a lot of monitoring cameras, the various resources are strained. In an example of FIG. 1, only one smart phone is used and the number of the monitoring cameras is small, but actually, the number of smart phones and the number of the monitoring cameras are considered to be increased in the system. Therefore, the strain of the various resources becomes a problem.

In order to solve such a problem, a camera control device according to an aspect of the present disclosure includes an entering prediction value calculator configured to calculate an entering prediction value representing a possibility of entering of a user terminal in a monitoring range of a camera based on moving history information about the user terminal, an entering prediction time calculator configured to calculate entering prediction time that is prediction time necessary for the entering of the user terminal in the monitoring range of the camera based on first information representing a position of the user terminal and second information representing a position of the camera, a preparation time calculator configured to calculate preparation time as time necessary for running an application on the camera, a determination unit configured to determine whether preparation for running an application on the camera based on the entering prediction value, the entering prediction time and the preparation time.

As a result, suitable time at which the preparation for the operation in the camera is started can be determined.

That is to say, efficient use of hardware resources such as cameras and enhanced camera functions can be realized.

Further, the preparation time may include time for transmission of the application from a place where the application stored to the camera. The determination whether the preparation for running the application on the camera is started may include a determination whether the application is installed on the camera.

As a result, the suitable time at which the application is installed on the camera can be determined.

Further, the determination whether the preparation for running the application on the camera is started may include a determination of time of activating the application in the camera As a result, the suitable time at which the application is activated in the camera can be determined.

Further, for example, the moving history information includes third information that is position information about the user terminal of predetermined time before, and the first information is information representing a current position of the user terminal. The entering prediction value calculator may calculate the entering prediction value based on the third information.

As a result, the suitable entering prediction value can be calculated.

For example, the moving history information includes fourth information as long-term moving history information about the user terminal, and the first information is information representing a current position of the user terminal. The entering prediction value calculator may calculate the entering prediction value based on the fourth information.

As a result, the suitable entering prediction value can be calculated.

For example, the fourth information may include information representing time for which the user terminal stays in the monitoring range of the camera.

As a result, the suitable entering prediction value can be calculated.

Further, even when the entering prediction value represents that the possibility of entering of the user terminal in the monitoring range of the camera is high, as the entering prediction time becomes longer than the preparation time, a possibility of installation of the application on the camera may be reduced.

As a result, the installation of the application on cameras on an unreasonably wide range can be avoided.

Further, when the camera retains the application, the preparation time may be calculated without consideration of the time for transmitting the application to the camera. Even when the entering prediction value represents that the possibility of the entering of the user terminal in the monitoring range of the camera is high, as the entering prediction time is longer than the preparation time, a possibility of uninstallation of the application from the camera may be increased.

As a result, unnecessary installed applications can be uninstalled, and the hardware resources of the camera can be effectively used.

Further, for example, the entering prediction value calculator may calculate the entering prediction value based on the moving history information and route information obtained from the user terminal.

As a result, the suitable entering prediction value can be calculated.

Further, for example, the entering prediction time calculator may calculate the entering prediction time based on the first information, the second information, and the moving history information about the user terminal.

As a result, the suitable entering prediction time can be calculated.

Further, for example, the entering prediction time calculator may calculate the entering prediction time based on the first information, the second information, and the route information obtained from the user terminal.

As a result, the suitable entering prediction time can be calculated.

These general or concrete aspects may be realized by a method, a system, an integrated circuit, a computer program or a computer-readable recording medium such as a CD-ROM, or by any combination of a method, a system, an integrated circuit, a computer program, and a recording medium.

An embodiment in the present disclosure is specifically described below with reference to the drawings.

The embodiment described below illustrates comprehensive or concrete examples. Numerical values, shapes, materials, components, arrangement positions and connecting forms of the components, steps and an order of the steps described in the following embodiment are examples, and thus do not intend to limit the present disclosure. Further, components that are not described in independent claims representing the top concepts in the components in the embodiment are described as any components.

Further, in the following description, like components are denoted by like numerical symbols. These names and functions are the same as each other. Therefore, detailed description about them is occasionally omitted.

Further, in this specification, the application may be an application package in which a plurality of related files are gathered into one bundle.

Exemplary Embodiment

Figure 2:
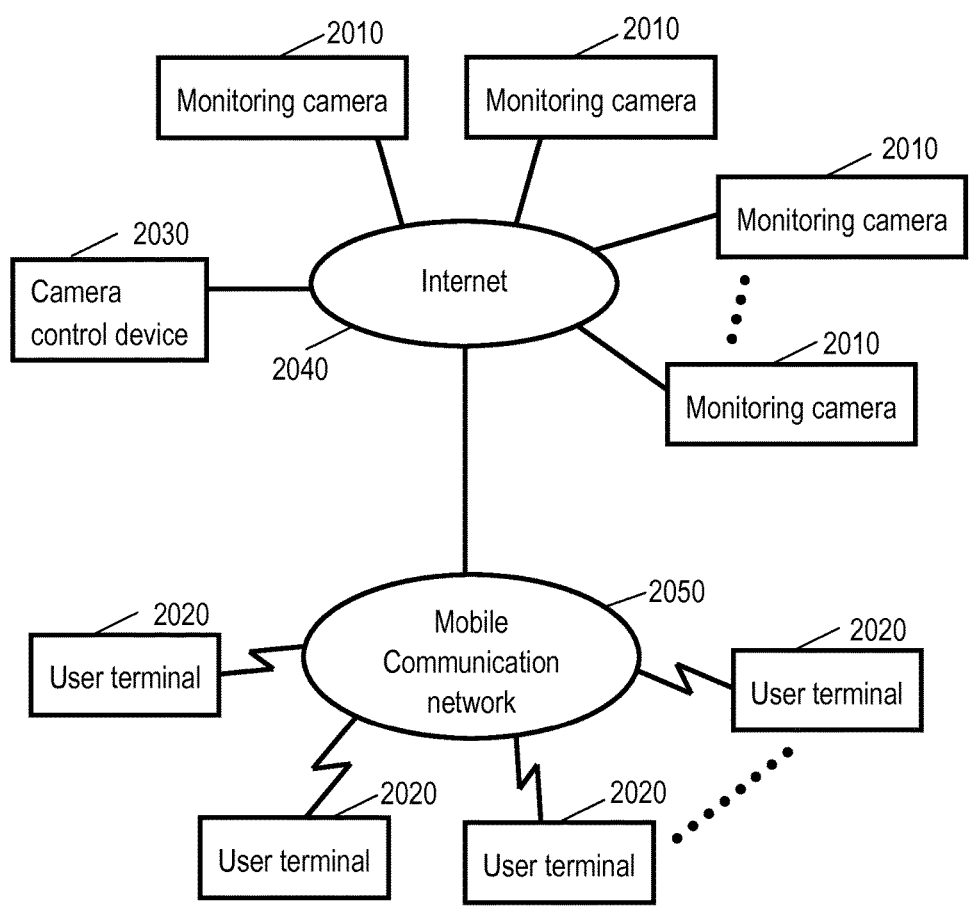
FIG. 2 is a block diagram illustrating an entire constitution of a camera control system according to an embodiment.

FIG. 2 is a block diagram illustrating an entire constitution of a camera control system according to an embodiment. This camera control system specifies, from a lot of fixed monitoring cameras 2010, monitoring cameras for monitoring regions where a predetermined user terminal is to be positioned. Then the camera control system installs an application including a function desired by a user on the specified monitoring cameras to realize service to be operated on the specified monitoring cameras.

Each of user terminals 2020 is a terminal that has a function for obtaining self-position information using GPS, and a function for continuously connecting to Internet 2040 using mobile communication network 2050. The terminal is, for example, a smart phone.

Applications can be dynamically installed on or uninstalled from monitoring camera 2010 via the network. The installed applications can be controlled so as to be activated or ended via the network. As the application that can be installed on monitoring camera 2010 and can be run, APIs (Application Programming Interface) for using the functions of monitoring camera 2010 are provided. APIs includes, for example, API for obtaining image data output from an image sensor, and API for transmitting and receiving data via the network. Use of these APIs enables an application to transmit data obtained by processing an image monitored by monitoring camera 2010 to any server or terminal via the network.

Camera control device 2030 is constituted physically as a computer system having a storage device such as a CPU, a memory, or a hard disk. Further, camera control device 2030 may be composed of a plurality of computer systems. In the camera control system in FIG. 2, camera control device 2030 plays a central role to manage information about all monitoring camera 2010 and user terminal 2020 connected to the Internet. Camera control device 2030 transmits various control requests to monitoring camera 2010 via the Internet, and controls installation, uninstallation, activation and ending of the application over monitoring camera 2010. Transmission and reception of information, various control requests between camera control device 2030 and monitoring camera 2010, and various control requests between camera control device 2030 and user terminal 2020, can be carried out by, for example, HTTP (Hypertext Transfer Protocol).

Figure 3:
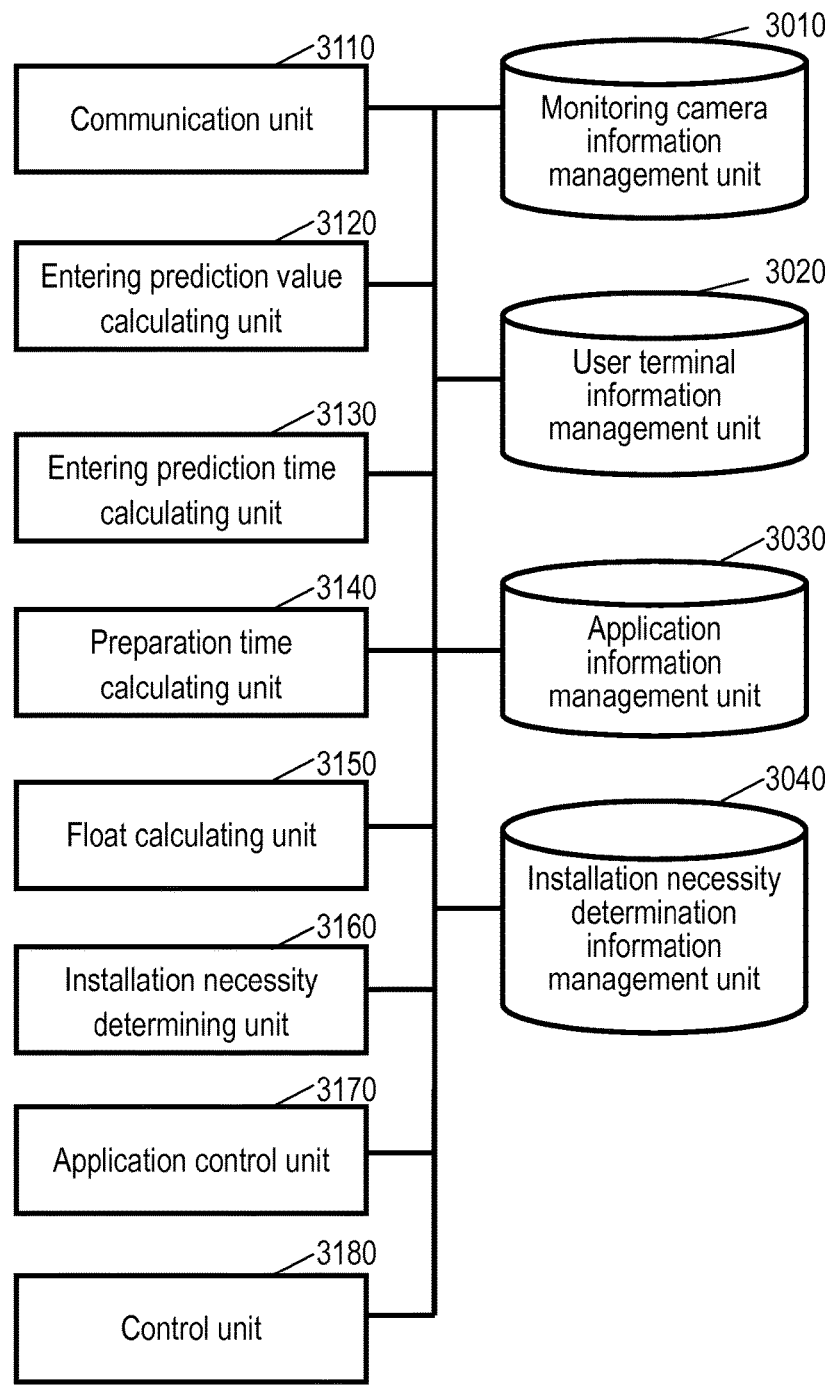
FIG. 3 is a block diagram illustrating a functional constitution of a camera control device according to the embodiment.

FIG. 3 is a block diagram illustrating a functional constitution of camera control device 2030 according to the embodiment. Camera control device 2030 includes monitoring camera information management unit 3010, user terminal information management unit 3020, application information management unit 3030, installation necessity determination information management unit 3040, communication unit 3110, entering prediction value calculating unit 3120, entering prediction time calculating unit 3130, preparation time calculating unit 3140, float calculation unit 3150, installation necessity determining unit 3160, application control unit 3170, and control unit 3180. These components are described in detail below.

Communication unit 3110 is a unit for connection to the Internet. Camera control device 2030 transmits and receives data, and the control requests to and from monitoring camera 2010 and user terminal 2020 via communication unit 3110.

Monitoring camera information management unit 3010 manages information about all the monitoring cameras. FIG. 4A illustrates monitoring camera information database 400 managed by monitoring camera information management unit 3010. A first line shows data type of each field, and second and thereafter lines show an example of actual data. Monitoring camera information database 400 includes a monitoring camera information record of each of the monitoring cameras. Each of the monitoring camera information records includes fields of a camera ID, monitoring camera position information, a communication speed, an activating application ID, and an installed application ID. Monitoring camera information management unit 3010 may include monitoring camera information database 400.

The Camera ID that is an identifier of a monitoring camera stored in the camera ID field (FIG. 4A). Each of all the monitoring cameras has a specific camera ID.

The monitoring camera position information that is data about longitude and latitude of the position where the monitoring camera is fixed is stored in the monitoring camera position information field.

The communication speed in a case where the data is transmitted and received between the monitoring cameras and the camera control device is stored in the communication speed field. The communication speed is used for estimating time necessary for transmitting an application to the monitoring camera when the application is installed on the monitoring camera. Further, since the communication speed fluctuates due to states of the network and the monitoring camera, the camera control device has a function for measuring the communication speed between each of the monitoring cameras and the camera control device at each constant time, for example, and updating the communication speeds into the latest information. For example, the camera control device measures time between transmission of predetermined information to the monitoring camera and reception of predetermined return information from the monitoring camera by the camera control device, and may determine the communication speed.

The activating application ID that is an identifier of the application being activated in the monitoring camera is stored in the activating application ID field. When a plurality of applications are simultaneously activated in the monitoring camera, the plurality of applications are stored in this field.

The installed application ID that is an identifier of the application already installed on the monitoring camera is stored in the installed application ID field. When the plurality of applications are simultaneously installed on the monitoring camera, the plurality of application IDs are stored in the installed application ID field. Further, the application specified by the application ID stored in the activating application ID field had been certainly and already installed. Therefore, in order to avoid overlapped storage of data, the application ID stored in the activating application ID field may be set not to be stored in the installed application ID field.

User terminal information management unit 3020 manages information about all the user terminals. FIG. 4B illustrates user terminal information database 410 managed by user terminal information management unit 3020. A first line shows data types of the respective fields, and second and thereafter lines show examples of actual data. User terminal information database 410 includes a user terminal information record of each user terminal. Each of the user terminal information records includes fields of a user terminal ID, user terminal position information, a use application ID, and moving history information. User terminal information management unit 3020 may include user terminal information database 410.

The user terminal ID that is an identifier of the user terminal is stored in the user terminal ID field (FIG. 4B). Each of all the user terminals has a specific user terminal ID.

The user terminal position information that is data about a latitude and a longitude of the position of the user terminal is stored in the user terminal position information field. Since the user terminal is a device that is assumed to move in the camera control system, the values stored in the user terminal position information field change every hour. For example, the user terminal notifies the camera control device of the position information about the user terminal, and the camera control device has a function for accepting the notification about the position information transmitted from the user terminal, and updating the values stored in the user terminal position information field into latest information.

The use application ID that is an identifier of the application used for monitoring a region where the user terminal is positioned is stored in the use application ID field. The camera control device makes a control so as to specify a monitoring camera that can monitor a region where a target user terminal is positioned, and install an application specified by a use application ID on the specified monitoring camera and activate the application. That is to say, the monitoring camera receives the application. When the target user terminal is moved, the camera control device makes control so as to specify a monitoring camera that can monitor a region of its moving destination, and similarly install an application specified by a use application ID on the specified monitoring camera and activate the application. That is to say, the application specified by the use application ID can be run on the monitoring camera positioned near the target user terminal while the user terminal is being always tracked. When one user terminal simultaneously uses a plurality of applications, a plurality of application identifiers are stored in the use application ID field. In this embodiment, for easy description, it is assumed that application to be used simultaneously for each user terminal is one at a maximum. That is to say, the description is given on the assumption that one application is related to one user terminal.

The moving history information about the user terminal is stored in the moving history information field. The moving history information may include short-term moving history information and long-term moving history information. The short-term moving history information may be pieces of the first pair information. Each of the pieces of the first pair information may include a piece of time information and a piece of the user terminal position information obtained at the time indicated by the piece of time information. The pieces of time may have predetermined regular intervals (for example: 15 seconds) during a short-term predetermined period (for example: latest 5 minutes). Further, the long-term moving history information may be pieces of the second pair information. Each of the pieces of the second pair information may include an integrated value of time for which the user terminal stayed in the monitoring range of the monitoring camera for a long-term predetermined period (for example, 6 months), and the camera ID of the monitoring camera.

The monitoring range of the monitoring camera may be specified by using an angle and a distance with the position of the monitoring camera being an original point. For example, when the monitoring range of the monitoring camera is a semicircular region extending from the position of the monitoring camera as the center from the north to the south and is within a radius of 1 meter or more to 2 meters or less, information such that (angle start information, angle end information, radius start information, radius end information)=(0 degree, 180 degrees, 1 meter, 2 meters) may be related to the corresponding camera ID so as to be stored as the monitoring range information in monitoring camera information database 400.

A determination of whether the user terminal enters or stays in the monitoring range of the monitoring camera may be made by determining whether the position information represented by the user terminal position information is included in the range specified by the monitoring range information.

Further, in order to simplify obtaining time of the user terminal entering in the monitoring range of the monitoring camera, the region specified by the user terminal position information and the monitoring range information is not used but the user terminal position information and the monitoring camera position information are used to specify a distance. For example, a liner distance between the position of the user terminal specified by the user terminal position information, and the position of monitoring camera specified by the monitoring camera position information may be used.

Application information management unit 3030 manages information about all the applications to be installed and run on the monitoring camera. FIG. 4C illustrates application information database 420 managed by application information management unit 3030, and first line shows data types of the respective fields, and second and thereafter lines show examples of actual data. Application information database 420 includes application information records of the respective applications. Each of the application information records includes fields of an application ID, a size, and an application saving place. Application information management unit 3030 may include application information database 420.

The application ID that is an identifier of the application is stored in the application ID field. Each of all the managed applications is given a specific application ID. The value used in the application ID field is used in the fields of the activating application ID, the installed application ID, and the use application ID.

The size information about the application is stored in the size field. When an application is installed on the monitoring camera, the application whose data size is shown in the size field is transmitted to the monitoring camera. At this time, a value stored in the size field is used for estimating time necessary for the transmission.

Information representing the saving place of the application is stored in the application saving place field. The camera control device may retain the application, or the user terminal that uses the application may retain the application. When the user terminal retains the application, not the information about the communication speed between the camera control device and the monitoring camera but the information about the communication speed between the user terminal and the monitoring camera is used for estimating the time necessary for the transmission of the application to the monitoring camera. Further, the application may be saved in a place other than the camera control device and the user terminal.

When the user terminal retains the application, communication speeds between the user terminal and monitoring cameras may be measured. Each of the measured communication speeds may be related to the corresponding user terminal ID in the user terminal information database 410 so as to store pairs of the measured communication speed and the corresponding monitoring camera ID.

Further, both the user terminal and the camera control device may retain the same application, and the camera control device may transmit the application to the monitoring camera. In this case, burden of measuring the communication speeds between the user terminal and the respective monitoring cameras can be reduced.

It may be possible for the user terminal not to save the application notify the camera control device of the use application ID related to a desired application and the user terminal ID. The camera control device may obtain the application related to the use application ID from the outside based on the notification information, and may retain this obtained application.

Installation necessity determination information management unit 3040 manages information used for determining whether an application used by the user terminal is installed on the monitoring camera. FIG. 5 illustrates installation necessity determination information database 500, first line shows data types of the respective fields, and second and thereafter lines show an example of actual data. Installation necessity determination information database 500 includes installation necessity determination information records of the respective user terminals. Each of the installation necessity determination information records includes fields of the user terminal ID, the camera ID, the entering prediction value, and float. Installation necessity determination information management unit 3040 may include installation necessity determination information database 500.

The user terminal ID that is an identifier of the user terminal is stored in the user terminal ID field (FIG. 5). A value used in this field is the value used for the user terminal ID in user terminal information database 410 in FIG. 4B.

Information for specifying an application related to each of the installation necessity determination information records is not indicated in installation necessity determination information database 500. Each of the installation necessity determination information records includes only one user terminal ID. Further, in this embodiment, as described above, one application is related to one user terminal. Further, with reference to user terminal information database 410 in FIG. 4B, one use application ID related to each of the user terminal IDs can be specified. Therefore, one application ID related to each of the installation necessity determination information records can be specified in FIG. 5 by using this correspondence information.

Further, since the installation necessity determination of the application is not necessary for the user terminal whose use application ID is not specified in user terminal information database 410 in FIG. 4B in the first place, information related to this user terminal is not included in installation necessity determination information database 500 of FIG. 5.

The camera ID that is an identifier of the monitoring camera is stored in the camera ID field (FIG. 5). A value used in the camera ID field (FIG. 5) is the value used in the camera ID field of monitoring camera information database 400 in FIG. 4A. Since it is needed to determine whether application related to the user terminal is installed on the monitoring camera for each of user terminal IDs in FIG. 5, the number of records of installation necessity determination information database 500 in FIG. 5 is a product of the number of the user terminals, each of the user terminals having the corresponding use application ID, and the total number of the monitoring cameras.

The entering prediction value that is a possibility of entering of the user terminal specified by the user terminal ID into the monitoring range of the monitoring camera specified by the camera ID is stored in the entering prediction value field. The entering prediction value is within a range between 0 and 1, and as likelihood of the entering is higher, the value is larger.

The float is stored in the float field. When the application related to the user terminal specified by the user terminal ID is installed and activated on the monitoring camera specified by the camera ID, time necessary for the completed installation and the activation is represented by preparation time T1, and prediction time necessary for the entering of the user terminal into the monitoring range of the monitoring camera is represented by entering prediction time T2, the float is expressed by the following formula:

$$Float = T2 - T1$$

Entering prediction value calculating unit 3120 calculates the entering prediction value of installation necessity determination information database 500 in FIG. 5.

Entering prediction time calculating unit 3130 calculates the entering prediction time that is the prediction time necessary for the entering of the user terminal into the monitoring range of the monitoring camera.

Preparation time calculating unit 3140 calculates preparation time that includes time necessary for receiving the application by the monitoring camera, and time necessary for installation and activation.

Float calculation unit 3150 calculates the float based on the entering prediction time calculated by entering prediction time calculating unit 3130, the preparation time calculated by preparation time calculating unit 3140, and the above formula.

Installation necessity determining unit 3160 determines which application is installed on each of the monitoring cameras or which application is uninstalled based on installation necessity determination information database 500 managed by installation necessity determination information management unit 3040.

Application control unit 3170 controls, for example, installation, uninstallation, activation and ending of the applications for the monitoring cameras.

Control unit 3180 controls monitoring camera information management unit 3010, user terminal information management unit 3020, application information management unit 3030, installation necessity determination information management unit 3040, communication unit 3110, entering prediction value calculating unit 3120, entering prediction time calculating unit 3130, preparation time calculating unit 3140, float calculation unit 3150, installation necessity determining unit 3160, and application control unit 3170 in order to realize the respective functions.

A concrete procedure of this camera application control system is described below with reference to the drawings.

Figure 6:
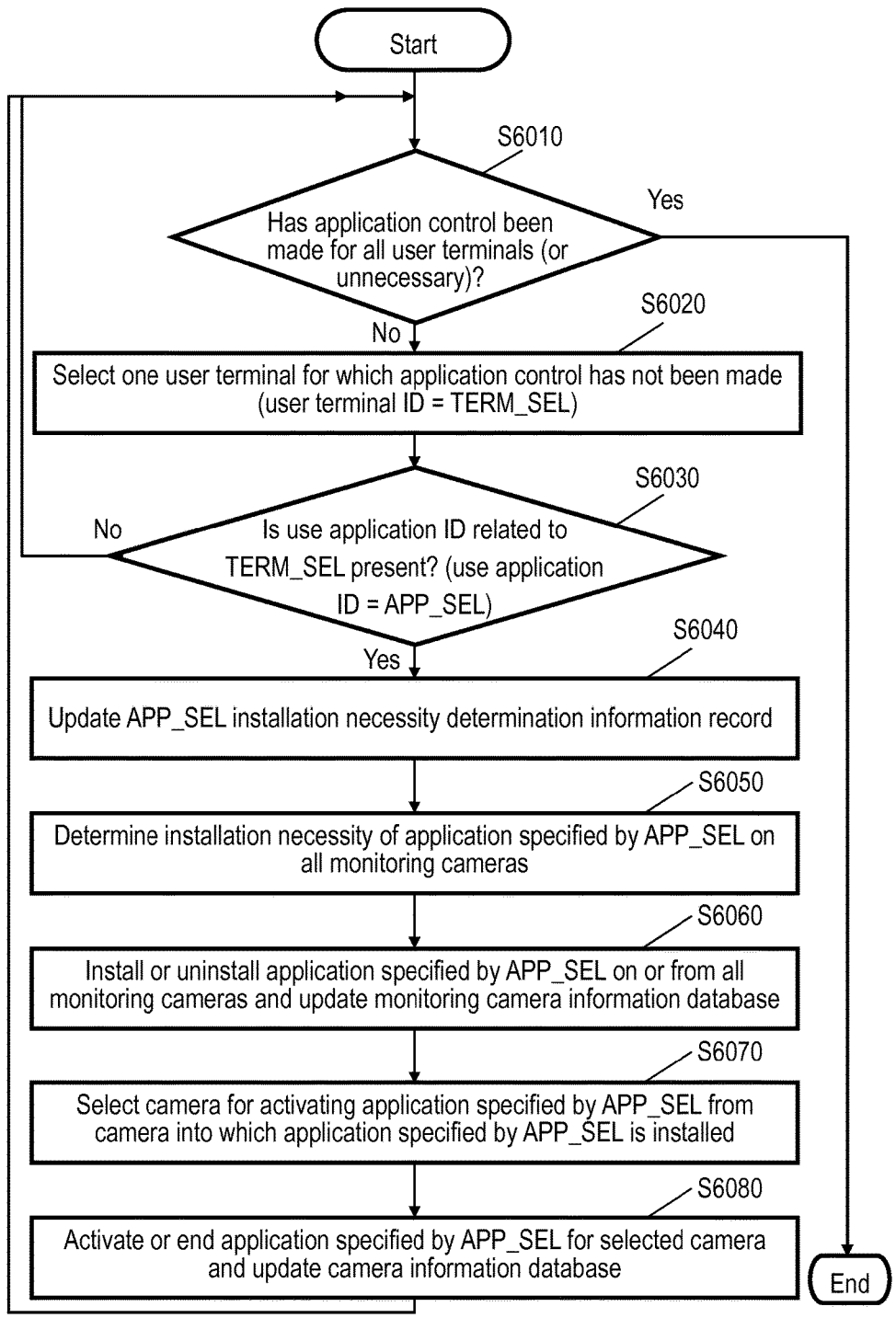
FIG. 6 is a flowchart illustrating a flow in a case where the camera control device controls applications on monitoring cameras according to the embodiment.

FIG. 6 is a flowchart illustrating a flow in a case where camera control device 2030 controls applications on monitoring cameras. Camera control device 2030 controls a series of steps S6040 to S6080 of the applications related to the respective user terminals managed by user terminal information management unit 3020 at, for example, every constant time. As to all the user terminals to be managed, the determination at S6010 is "No" until the series of control (S6040 to S6080) of the applications is completed, and the user terminal for which the series of control (S6040~S6080) of the application is not yet made is selected (S6020), so that the control at S6040 to S6080 is repeated. As to all the user terminals to be managed, when the series of control (S6040 to S6080) of the applications is completed, the determination at S6010 is "Yes." Namely, the process in camera control device 2030 to control the applications on the monitoring cameras is ended. In the following description, the user terminal ID of the user terminal selected at S6020 is TERM_SEL. Camera control device 2030 obtains a use application ID related to TERM_SEL with reference to user terminal information database 410 managed by user terminal information management unit 3020. At this time, when a use application ID related to TERM_SEL is not present, the determination at S6030 is "No", and thus the series of control (S6040 to S6080) of the applications for TERM_SEL is not necessary. For this reason, the process after S6040 is not executed and the sequence returns to the determination at S6010.

The process in the case where the determination is made as "Yes" at S6030 is described below. In the following description, the use application ID for specifying the application related to the user terminal specified by TERM_SEL is APP_SEL.

Next, an APP_SEL installation necessity determination information record is updated (S6040). The APP_SEL installation necessity determination information record is a record having value TERM_SEL as the user terminal ID in installation necessity determination information database 500.

Figure 7:
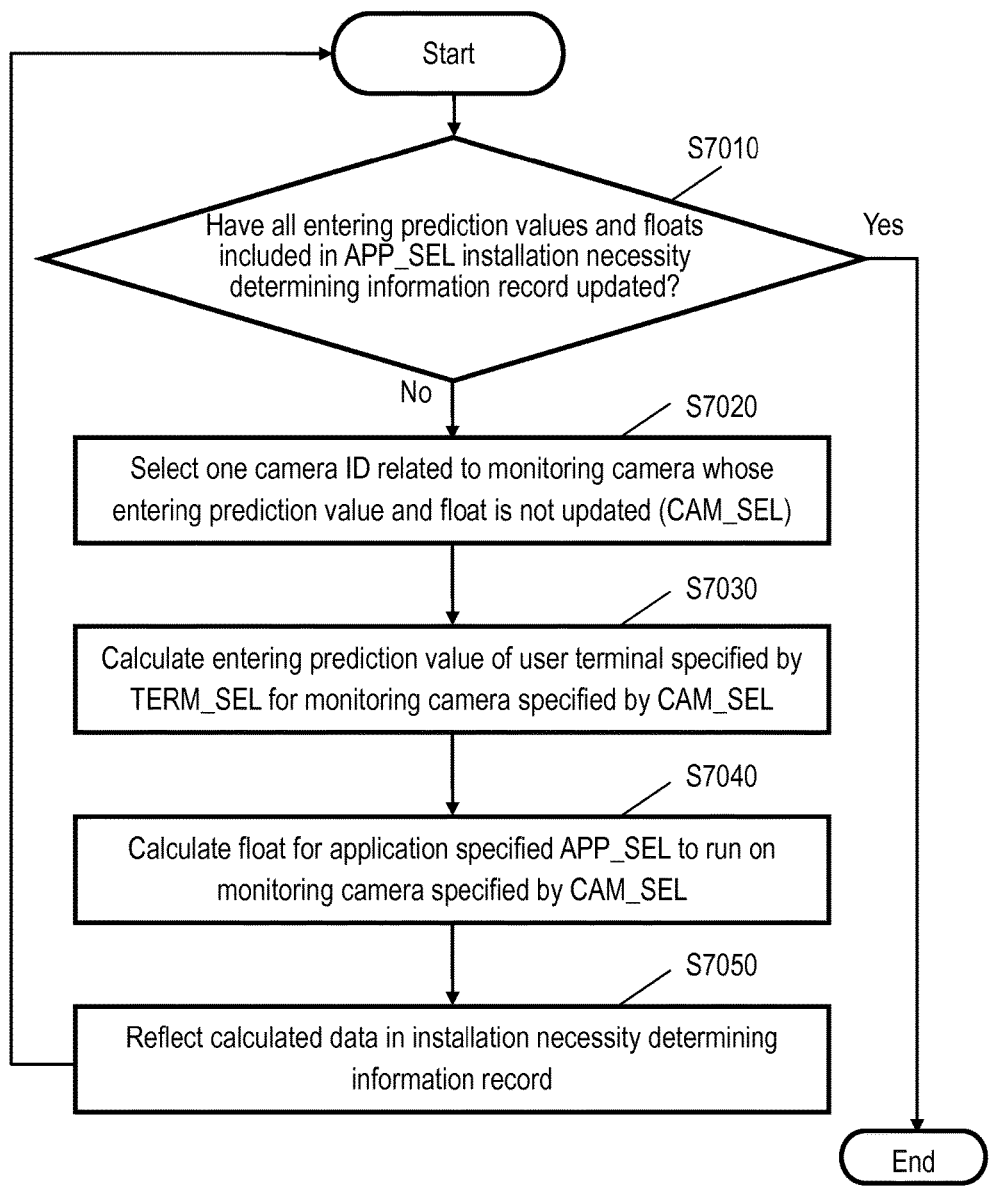
FIG. 7 is a flowchart specifically illustrating a flow of updating an APP_SEL installation necessity determination information record according to the embodiment.

FIG. 7 is a flowchart illustrating in detail the flow at step S6040 for updating the APP_SEL installation necessity determination information record.

A determination is made whether all entering prediction values and floats included in the APP_SEL installation necessity determination information record have been updated (S7010). When entering prediction values and floats that have not been updated are present, the determination is made as "No" and the process after S7020 is repeated. When all the entering prediction values and floats included in the APP_SEL installation necessity determination information record have been updated, the determination is made as "Yes", and a series of the process for updating the APP_SEL installation necessity determination information record is ended. When the determination is made as "No" at S7010, one camera ID whose entering prediction value and float included in the APP_SEL installation necessity determination information record are not updated is selected (S7020). The selected camera ID is determined as CAM_SEL. Entering prediction value calculating unit 3120 calculates an entering prediction value that is the possibility that the user terminal specified by TERM_SEL enters the monitoring range of the monitoring camera specified by CAM_SEL based on moving history information about the user terminal specified by TERM_SEL (S7030).

The moving history information of the user terminal specified by TERM_SEL is included in user terminal information database 410. Camera control device 2030 increases the entering prediction value of the monitoring camera whose monitoring range is a spot of frequent stay and passing in the past or decreases the entering prediction value of the monitoring camera whose monitoring range is an avoided spot, based on, for example, long-term moving history information with reference to the moving history information specified by TERM_SEL.

When the total of the time of stay of a user terminal in the monitoring range of a specific monitoring camera is longer than the total of the time of stay of the user terminal in the monitoring range of another monitoring camera, the entering prediction value of this specific monitoring camera related to the user terminal may be larger than the entering prediction value of another monitoring camera.

When the number of times of passing of a user terminal through the monitoring range of a specific monitoring camera is larger than the number of times of passing of the user terminal through the monitoring range of another monitoring camera, the entering prediction value of that specific monitoring camera related to the user terminal may be larger than the entering prediction value of another monitoring camera. In the determination of whether the user terminal passes through the monitoring range of the monitoring camera, when the position represented by the user terminal position information in FIG. 4B is included in the monitoring range of monitoring camera at least once in predetermined time (for example, 10 minutes), the determination that the user terminal passes through the range once may be made.

Further, for example, a current moving direction is determined based on the short-term moving history information, and the entering prediction value of the monitoring camera whose monitoring range is a spot in a direction of a next moving destination may be larger than the entering prediction value of the monitoring camera whose monitoring range is past passed spot.

Further, when a plurality of monitoring camera whose monitoring range includes spots located in the same direction viewed from the current spot, in consideration of likelihood of a change of the moving direction and the stay in the spot during movement, the entering prediction value of the monitoring camera located closer to the current spot may be increased.

The current moving direction and the moving speed of the user terminal may be calculated based on the short-term moving history information, such as moving history information within 5 minutes from a current time. For example, the position of the user terminal of 5 minutes before is a starting point and a direction on an extended line including the current position of the user terminal, may be a moving direction. Further, for example, a linear distance between the position of the user terminal of 5 minutes before and the current position of the user terminal is used so that the moving speed may be determined. Further, the moving speed may be set to a fixed value. When the current position of the user terminal is the starting point and the position of the target camera is the end point, the entering prediction value of the monitoring camera whose monitoring position is closer to a straight line for connecting the start point and the end point may be larger.

Figure 9:
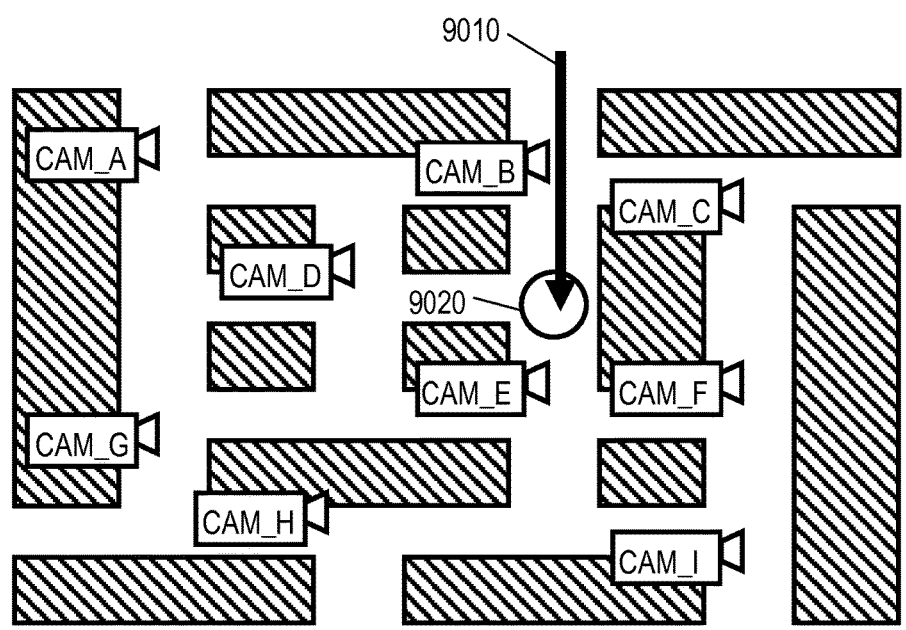
FIG. 9 is a diagram illustrating a calculating example of an entering prediction value according to the embodiment.

When the entering prediction value is calculated according to such a rule, and arrow 9010 indicating a route through which the user terminal passes on a map of FIG. 9 and is currently positioned at spot 9020, the entering prediction values of the respective monitoring cameras obtain values such as, CAM_A: 0.1, CAM_B: 0.3, CAM_C: 0.2, CAM_D: 0.5, CAM_E: 0.9, CAM_F: 0.5, CAM_G: 0.4, CAM_H: 0.6, CAM_I: 0.6. Further, when the user terminal specified by TERM_SEL has a navigation function and a destination is set in the navigation function of the user terminal specified by TERM_SEL, the following operation may be performed. That is to say, entering prediction value calculating unit 3120 may set the entering prediction value to be larger for the monitoring camera whose monitoring range includes the destination and a navigation route to the destination using navigation route information obtained from the user terminal.

Back to the description using FIG. 7, the float for running the application specified by APP_SEL on the monitoring camera specified by CAM_SEL is calculated at step S7040.

Figure 8:
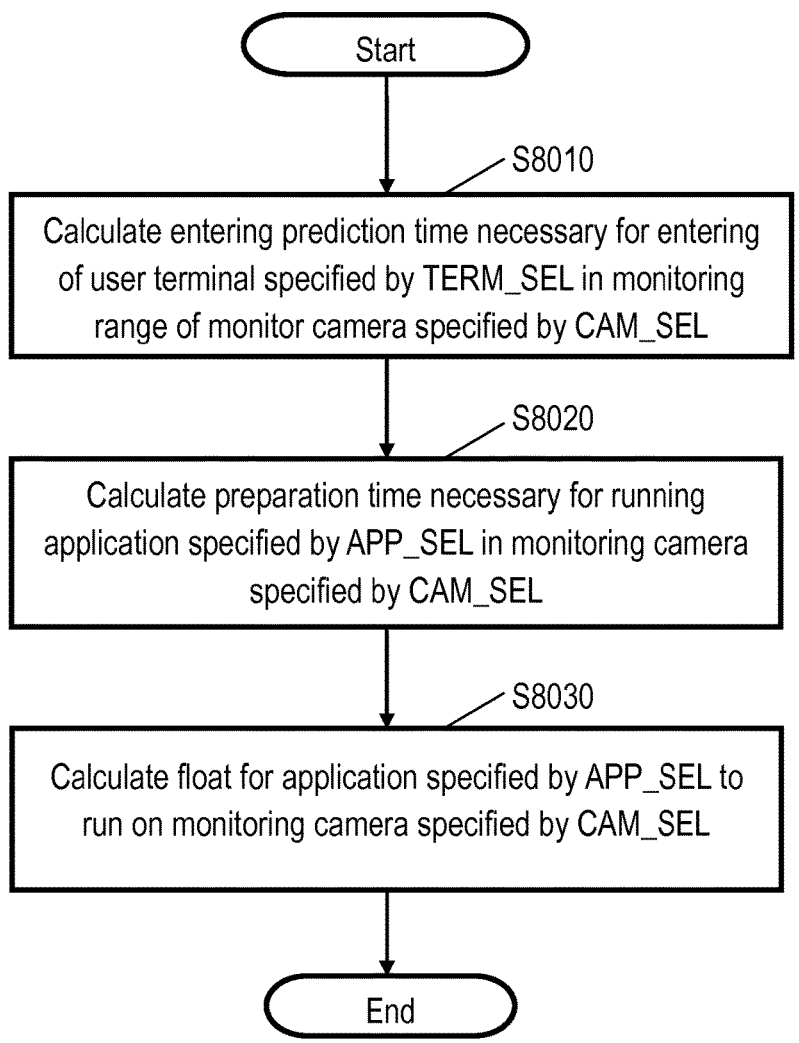
FIG. 8 is a flowchart specifically illustrating a flow of calculating a float according to the embodiment.

FIG. 8 is a detailed flowchart of step S7040 for calculating the float. In order to calculate the float, entering prediction time calculating unit 3130 calculates the entering prediction time necessary when the user terminal specified by TERM_SEL enters in the monitoring range of the monitoring camera specified by CAM_SEL (S8010). As a method for calculating the entering prediction time by entering prediction time calculating unit 3130, the linear distance between the monitoring camera specified by CAM_SEL and the user terminal specified by TERM_SEL or a distance along the route is calculated based on the position information about the monitoring camera specified by CAM_SEL and the position information about the user terminal specified by TERM_SEL. A latest moving speed is calculated based on the moving history information stored in user terminal information database 410. The latest moving speed may be calculated by using the short-term moving history information. The entering prediction time can be calculated based on the distance and the calculated moving speed. When the moving speed is obtained, instead of the moving history information, a prepared fixed value or a fixed value selected in advance by a user may be used. Further, when the user terminal specified by TERM_SEL has the navigation function, and traffic jam information or transportation information can be used, calculating accuracy of the entering prediction time can be heightened. Further, when entering prediction time calculating unit 3130 calculates the entering prediction time, the route information provided by the navigation function of the user terminal specified by TERM_SEL is obtained from the user terminal, and the distance between the position of the monitoring camera position information specified by CAM_SEL and the position of the user terminal position information specified by TERM_SEL may be obtained along the route represented by the route information.

At next step S8010, preparation time calculating unit 3140 calculates the preparation time necessary for running the application specified by APP_SEL on the monitoring camera specified by CAM_SEL (S8020). In the method for calculating the preparation time by preparation time calculating unit 3140, the size of the application specified by APP_SEL is obtained with reference to application information database 420 managed by application information management unit 3030. The saving place of the application is specified with reference to the corresponding application saving place filed in application information database 420. Here, the application is saved in camera control device 2030.

The communication speed between the monitoring camera specified by CAM_SEL and camera control device 2030 is obtained with reference to monitoring camera information database 400 managed by monitoring camera information management unit 3010, and the time necessary for transmitting the application to the monitoring camera specified by CAM_SEL is calculated based on the obtained size and the obtained communication speed. The time necessary for the installing process and the activating process in the monitoring camera specified by CAM_SEL is added to the calculated time necessary for the transmission, so that the calculation of the preparation time is completed. A function of measuring current self performance such as a usage rate of CPU and a usage rate of a memory may be mounted to each of the monitoring cameras, and each of the monitoring cameras may transmit measured data to the camera control device periodically. The camera control device may relate the measured data to the camera ID so as to store them. The camera control device may calculate the time necessary for the installing process and the time necessary for activating time based on the stored data and the size of the application. As the usage rate of CPU and the usage rate of the memory are higher and the size of the application is larger in the camera control device, the time necessary for the installing process and the time necessary for the activating process may be longer. Further, the camera control device may not use the measured data but may use only the application size so as to determine the time necessary for the installing process and the time necessary for the activating process.

Float calculation unit 3150 calculates float for the application specified by APP_SEL to run on the monitoring camera specified by CAM_SEL (S8030) at next step S8020. As described before, the float is expressed by the following formula using entering prediction time T2 calculated at S8010 and preparation time T1 calculated at S8020.

$$Float = T2 - T1$$

Back to the description using FIG. 7, at next step S7040, the entering prediction value calculated at S7030 and the float calculated at S7040 are reflected in the installation necessity determination information record (S7050).

Figure 10:
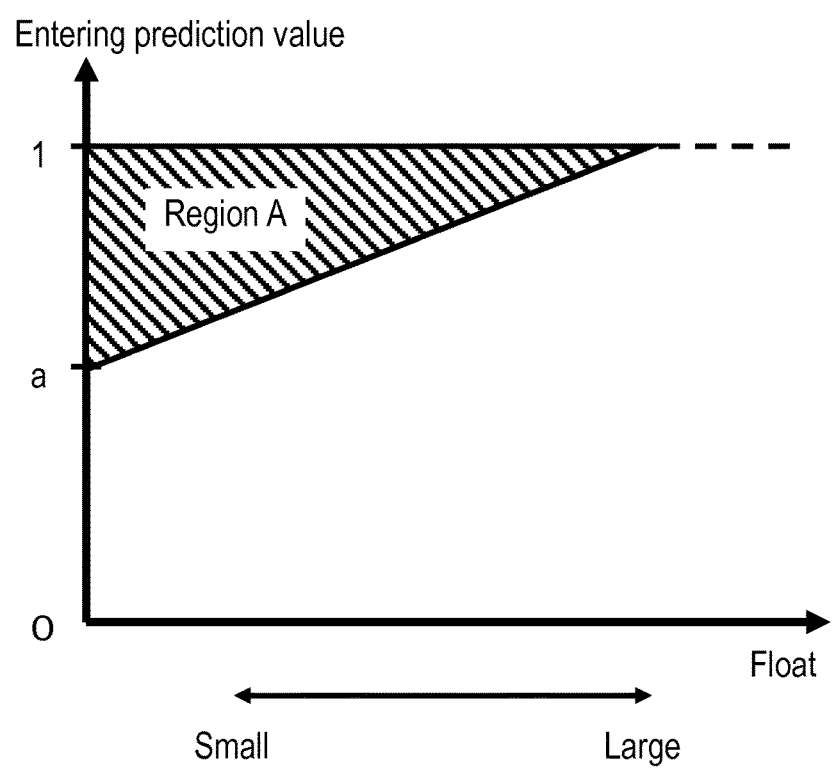
FIG. 10 is a diagram illustrating a condition that an application is installed on a monitoring camera according to the embodiment.

Back to the description using FIG. 6, at next step S6040, a determination is made whether the installation of the application specified by APP_SEL is necessary for all the monitoring cameras (S6050). The determination is made whether the application specified by APP_SEL is installed on each of the monitoring cameras by using the entering prediction value calculated at S6040 and the float. This determination is made so that the predetermined application is installed on the monitoring camera that is more likely to be used in more immediate future, and the installation is completed at time where the monitoring camera gets ready to run the predetermined application when the user terminal enters in the monitoring range of the monitoring camera. Specifically, for example, as shown in FIG. 10, when a vertical axis means the entering prediction value, and a horizontal axis means the float, the camera control device determines that the application specified by APP_SEL is installed on only the monitoring camera having a camera ID with a combination of the entering prediction value and the float within a region A as the a slanted line region.

That is to say, in the camera control device, even when the entering prediction value represents that the possibility of the entering of the user terminal in the monitoring range of the monitoring camera is high, as the entering prediction time is longer than the preparation time, namely, as the float is longer, the possibility of installing the application on the monitoring camera is decreased. As a result, in addition to the installation of the application securely on the monitoring camera that is likely to be used before the running of the application, the installation of the application on monitoring cameras on a wide range uselessly can be repressed.

Further, even when the application is already installed on the monitoring camera and the entering prediction value represents the high possibility of the entering of the user terminal in the monitoring range of the monitoring camera, as the entering prediction time is longer than the preparation time, namely, as the float is longer, the camera control device increases the possibility of uninstalling the application from the monitoring camera.

When the target application is already installed on the monitoring camera, the preparation time may be calculated without taking the time for transmitting the application to the monitoring camera into consideration.

When the monitoring camera is in a dense zone, a lot of the monitoring cameras having the entering prediction value and the float in the region A of FIG. 10 is likely present, but in such a case, a lot of the monitoring cameras may be ranked so that the monitoring camera that is more suitable for running the application is selected. For example, some applications are suitable for wide-angle monitoring cameras, and applications for transmitting more data are suitable for monitoring cameras with higher communication speed.

Alternatively, as proposed in Japanese Patent Publication No. 2005-142683, some applications are likely to be suitable for a monitoring camera that can capture a front of the owner of the user terminal. When information about the running of the respective applications on the monitoring cameras is added to application information database 420 and information about resources and installation conditions of the monitoring cameras is added to monitoring camera information database 400, the monitoring camera suitable for the applications are selected from the monitoring cameras having the entering prediction value and the float in the region A in FIG. 10.

Back to the description using FIG. 6, at next step S6050, application control unit 3170 installs the application specified by APP_SEL on the monitoring cameras for which the determination of the installation is necessary at S6050, and uninstalls the application specified by APP_SEL from all the monitoring camera for which the installation is unnecessary at S6050 (when the application is not installed, the uninstallation is not carried out), and updates the installed application ID field of monitoring camera information database 400 (S6060). That is to say, when the application specified by APP_SEL is installed, APP_SEL is recorded in the installed application ID field. When the installation of the application specified by APP_SEL is unnecessary, APP_SEL is deleted from the installed application ID field.

A monitoring camera for activating the application specified by APP_SEL is selected from all the monitoring camera on which the application specified by APP_SEL is installed (S6070). As to the method for selecting the monitoring camera, for example, a monitoring camera that can monitor, with best image quality, the region where the user terminal specified by TERM_SEL is positioned may be selected. Alternatively, information about suitable monitoring cameras where the respective applications run is added to the application information database, information about the resources and the setting conditions of the respective monitoring cameras is added to monitoring camera information database 400, and the monitoring cameras suitable for the applications, respectively, may be selected based on these information. Further, in a case of an application for treating a video simultaneously from a plurality of angles, a plurality of monitoring cameras are selected, so that one application may be activated simultaneously in the plurality of monitoring cameras.

Next, application control unit 3170 activates the application specified by APP_SEL in the selected monitoring camera. When the application specified by APP_SEL already runs on an unselected monitoring camera, application control unit 3170 finishes the running application specified by APP_SEL. Application control unit 3170 updates the activating application ID field of monitoring camera information database 400 (S6080). That is to say, when the application specified by APP_SEL is activated, APP_SEL is recorded in the activating application ID field. Further, when the running of the application specified by APP_SEL is ended, APP_SEL is deleted from the activating application ID field, and APP_SEL is recorded in the installed application ID field. As described above, the application ID stored in the activating application ID field may be prevented from being stored in the installed application ID field. The series of the control process for the application related to TERM_SEL is completed at step S6080, and the sequence returns to the determination at S6010.

Description about the flowchart in FIG. 6 is ended.

In FIG. 7, the float is calculated for all the monitoring cameras at S7040, but when the entering prediction value calculated at S7030 is a certain prescribed value or less, the float does not have to be calculated. For example, when the application is installed on only the monitoring camera having the combination of the entering prediction value and the float present in the region A of FIG. 10, the float is not calculated for the monitoring camera whose entering prediction value is a or less in FIG. 10. This is because the process for calculating the float of the monitoring camera on which the application is unlikely installed, and the process for calculating the float of the monitoring camera from which the application is securely uninstalled can be eliminated.

In this embodiment, camera control device 2030 makes a series of control S6040 to S6080 of the applications related to the user terminals, respectively, over all the user terminals managed by user terminal information management unit 3020 at every constant time. However, in another embodiment, the series of control may be made on the applications related to the user terminals at different timings. For example, when the user terminal whose moving speed is high controls the application at frequency higher than the user terminal whose moving speed is low, likelihood that switching of the monitoring camera for running the application is delayed is reduced for the user terminal whose speed is high. Further, the user terminal whose speed is low can be prevented from executing the information updating process uselessly and frequently.

The monitoring camera already retains the application, but when the application is not activated in the monitoring camera, preparation time calculating unit 3140 sets the preparation time as time necessary for activating the application. Installation necessity determining unit 3160 may determine a time at which the application is activated in the monitoring camera based on the entering prediction value, the entering prediction time and the preparation time instead of the determination whether the application is installed on the monitoring camera. This determination may be made based on the entering prediction value, the entering prediction time, the preparation time and FIG. 10 as described in the embodiment.

Camera control device 2030 can recognize a state that the monitoring camera already retains the application, but the application is not yet activated in the monitoring camera, by checking the activating application ID related to the monitoring camera ID and the installed application ID in monitoring camera information database 400.

Camera control device 2030 sends the monitoring camera the determined time in advance, and the monitoring camera may activate the application at the notified time.

Further, camera control device 2030 instructs the monitoring camera to activate the application just before the determined time, and the monitoring camera that receives the activation notification from camera control device 2030 may immediately activate the application.

Modification

The embodiment is described as the illustrating of the technique disclosed in this application. However, the technique in this disclosure is not limited to the embodiment. The following case is also included in the embodiment.

(1) The above device may be, specifically, a computer system composed of a microprocessor, a ROM, a RAM, a hard disk unit, a display unit, a keyboard, and a mouse. Computer programs are stored in the RAM or the hard disk unit. The microprocessor operates according to the computer programs so that the respective devices achieve the functions. The computer program is constituted by combining a plurality of command codes representing the instructions to the computer in order to achieve the predetermined functions.

(2) Some or all of the components composing the each device may be composed of one system LSI (Large Scale Integration). The system LSI is an ultra-multifunction LSI manufactured by integrating a plurality of composing parts onto one chip, and specifically is a computer system composed of a microprocessor, a ROM, and a RAM. The computer programs are stored in the RAM. When the microprocessor operates according to the computer programs, the system LSI achieves its function.

(3) Some or all of the components composing each of the respective devices may be an IC card or a single module that is attachable to each of the devices. The IC card or the module is a computer system composed of a microprocessor, a ROM, and a RAM. The IC card or the module may include the above ultra-multifunction LSI. The microprocessor operates according to the computer program, so that the IC card or the module achieve the function. The IC card or the module may have a tamper-resistant property.

(4) The camera control device according to this embodiment may be the above-described method. Further, such a method may be a computer program realized by a computer or a digital signal composed of a computer program.

Further, the camera control device according to the embodiment may be such that a computer program or a digital signal is recorded in a recording medium readable by a computer, such as a flexible disk, a hard disk, a CD-ROM, an MO, a DVD, a DVD-ROM, a DVD-RAM, a BD (Blu-ray (registered trademark) Disc), or a semiconductor memory. Further, the camera control device may be a digital signal recorded in such a recording medium.

Further, the camera control device according to this embodiment may be a computer program or a digital signal that is transmitted via a network including a telecommunication line, a wireless or wired communication line, and the Internet, or data broadcasting.

Further, the camera control device according to this embodiment is a computer system having a microprocessor and a memory, the memory stores the above computer program, and the microprocessor may operate according to the computer program.

Further, the program or the digital signal is recorded in a recording medium and the recording medium is carried, or the program or the digital signal is transmitted via the network, so that an independent another computer system may be used.

(5) The above embodiment and the modified examples may be combined.

The camera control device according to the present disclosure is useful as a device that can determine suitable time at which the preparation for running the application on the camera is started.

What is claimed is:

1. A camera control device for controlling cameras comprising:
an entering prediction value calculator configured to calculate a first entering prediction value representing a possibility of a user terminal entering into a monitoring range of a first camera and a second entering prediction value representing a possibility of the user terminal entering a monitoring range of a second camera, based on movement history information about the user terminal with respect to a position of the first camera and with respect to a position of the second camera, the monitoring range of the first camera being a range in which an image of the user terminal is captured by the first camera and the monitoring range of the second camera being a range in which the image of the user terminal is captured by the second camera, the movement history information including fourth information as long-term movement history information about the user terminal, the entering prediction value calculator calculates the first entering prediction value larger than the second entering prediction value when the fourth information indicates a total time of stay of the user terminal in the monitoring range of the first camera for a first predetermined time is longer than the total of the time of stay of the user terminal in the monitoring range of the second camera;
an entering prediction time calculator configured to calculate a first entering prediction time and a second entering prediction time, the first entering prediction time being a prediction time necessary for the user terminal to enter into the monitoring range of the first camera based on first information representing a current position of the user terminal and second information representing the position of the first and the second cameras, the second entering prediction time being a prediction time necessary for the user terminal to enter into the monitoring range of the second camera based on the first information and the second information;
a preparation time calculator configured to calculate a first preparation time necessary for running a first application on the first camera and a second preparation time necessary for running a second application on the second camera; and
a determination unit configured to determine whether preparation for running the first application on the first camera is started based on the first entering prediction value, the first entering prediction time and the first preparation time and whether preparation for running the second application on the second camera is started based on the second entering prediction value, the second entering prediction time and the second preparation time.

2. The camera control device according to claim 1, wherein
the first preparation time includes time for transmitting the first application to the first camera from a place storing the first application,
the second preparation time includes time for transmitting the second application to the second camera from a place storing the second application,
the determination whether the preparation for running the first application on the first camera is started includes a determination whether the first application is installed on the first camera, and
the determination whether the preparation for running the second application on the second camera is started includes a determination whether the second application is installed on the second camera.

3. The camera control device according to claim 2, wherein
the movement history information includes third information that is position information about the user terminal at a predetermined time before a current time, and
the entering prediction value calculator calculates the first entering prediction value and the second entering prediction value, based on the third information.

4. The camera control device according to claim 2, wherein
the entering prediction value calculator calculates the first entering prediction and the second entering prediction value based on the movement history information, and route information obtained from the user terminal.

5. The camera control device according to claim 2, wherein
the entering prediction time calculator calculates the first entering prediction time and the second entering prediction time, based on the first information, the second information, and the movement history information about the user terminal.

6. The camera control device according to claim 2, wherein
the entering prediction time calculator calculates the first entering prediction time and the second entering prediction time, based on the first information, the second information, and route information obtained from the user terminal.

7. The camera control device according to claim 1, wherein
the determination whether the preparation for running the first application on the first camera is started includes a determination of time of activating the first application in the first camera, and
the determination whether the preparation for running the second application on the second camera is started includes a determination of a time of activating the second application in the second camera.

8. The camera control device according to claim 1, wherein
even when the first entering prediction value represents that the possibility of the user terminal entering into the monitoring range of the first camera is high, as the first entering prediction time becomes longer than the first preparation time, a possibility of installation of the first application on the first camera is reduced, and
even when the second entering prediction value represents that the possibility of the user terminal entering into the monitoring range of the second camera is high, as the second entering prediction time becomes longer than the second preparation time, a possibility of installation of the second application on the second camera is reduced.

9. The camera control device according to claim 8, wherein
when the first camera retains the first application, the first preparation time is calculated without consideration of the time for transmitting the first application to the first camera,
when the second camera retains the second application, the second preparation time is calculated without consideration of the time for transmitting the second application to the second camera,
even when the first entering prediction value represents the possibility of the user terminal entering into the monitoring range of the first camera is high, as the first entering prediction time is longer than the first preparation time, a possibility of uninstallation of the first application from the first camera is increased, and
even when the second entering prediction value represents the possibility of the user terminal entering into the monitoring range of the second camera is high, as the second entering prediction time is longer than the second preparation time, a possibility of uninstallation of the second application from the second camera is increased.

10. The camera control device according to claim 1, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera has a wider angle.

11. The camera control device according to claim 1, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera has higher communication speed.

12. The camera control device according to claim 1, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera captures a front of a user owning the user terminal.

13. A camera control method for controlling cameras, comprising:
  calculating a first entering prediction value representing a possibility of a user terminal entering into a monitoring range of a first camera and a second entering prediction value representing a possibility of the user terminal entering a monitoring range of a second camera, based on moving history information about the user terminal with respect to a position of the first camera and with respect to a position of the second camera, the monitoring range of the first camera being a range in which an image of the user terminal is captured by the first camera and the monitoring range of the second camera being a range in which the image of the user terminal is captured by the second camera, the movement history information including fourth information as long-term movement history information about the user terminal, the entering prediction value calculator calculates the first entering prediction value larger than the second entering prediction value when the fourth information indicates a total time of stay of the user terminal in the monitoring range of the first camera for a first predetermined time is longer than the total of the time of stay of the user terminal in the monitoring range of the second camera;
  calculating a first entering prediction time and a second entering prediction time, the first entering prediction time being a prediction time necessary for the user terminal to enter into the monitoring range of the first camera based on first information representing a current position of the user terminal, and second information representing a position of the first and the second camera, the second entering prediction time being a prediction time necessary for the user terminal to enter into the monitoring range of the second camera based on the first information and the second information;
  calculating a first preparation time necessary for running a first application on the first camera and a second preparation time necessary for running a second application on the second camera; and
  determining whether preparation for running the first application on the first camera is started based on the first entering prediction value, the first entering prediction time, and the first preparation time and whether preparation for running the second application on the second camera is started based on the second entering prediction value, the second entering prediction time and the second preparation time.

14. The camera control method according to claim 13, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera has a wider angle.

15. The camera control method according to claim 13, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera has higher communication speed.

16. The camera control method according to claim 13, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera captures a front of a user owning the user terminal.

17. A camera control system comprising a camera control device, a user terminal, and cameras, wherein
  the camera control device includes:
    an entering prediction value calculator configured to calculate a first entering prediction value representing a possibility of a user terminal entering into a monitoring range of a first camera and a second entering prediction value representing a possibility of the user terminal entering a monitoring range of a second camera, based on moving history information about the user terminal with respect to a position of the first camera and with respect to a position of the second camera, the monitoring range of the first camera being a range in which an image of the user terminal is captured by the first camera and the monitoring range of the second camera being a range in which the image of the user terminal is captured by the second camera, the movement history information including fourth information as long-term movement history information about the user terminal, the entering prediction value calculator calculates the first entering prediction value larger than the second entering prediction value when the fourth information indicates a total time of stay of the user terminal in the monitoring range of the first camera for a first predetermined time is longer than the total of the time of stay of the user terminal in the monitoring range of the second camera an entering prediction time calculator configured to calculate a first entering prediction time and a second entering prediction time, the first entering prediction time being a prediction time necessary for the user terminal to enter into the monitoring range of the first camera based on first information representing a current position of the user terminal and second information representing a position of the first and the second cameras, the second entering prediction time being a prediction time necessary for the user terminal to enter into the monitoring range of the second camera based on the first information and the second information;

a preparation time calculator configured to calculate a first preparation time necessary for running a first application on the first camera and a second preparation time necessary for running a second application on the second camera; and a determination unit configured to determine whether preparation for running of the first application on the first camera is started based on the first entering prediction value, the first entering prediction time and the first preparation time and whether preparation for running the second application on the second camera is started based on the second entering prediction value, the second entering prediction time and the second preparation time, the user terminal sends the camera control device the first information, the first camera receives information from the camera control device when the determination unit determines that the preparation for running the first application on the first camera is started, and the second camera receives information from the camera control device when the determination unit determines that the preparation for running the second application on the second camera is started.

18. The camera control system according to claim 17, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera has a wider angle.

19. The camera control system according to claim 17, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera has higher communication speed.

20. The camera control system according to claim 17, wherein when (i) the first entering prediction value, the first entering prediction time and the first preparation time satisfy a predetermined condition and the second entering prediction value, the second entering prediction time and the second preparation time satisfy the predetermined condition and (ii) the first application is identical to the second application, one of the first camera and the second camera is selected to run the identical application by referring to data indicating which camera captures a front of a user owning the user terminal.

* * * * *